United States Patent
Burks et al.

(10) Patent No.: US 6,845,494 B2
(45) Date of Patent: Jan. 18, 2005

(54) METHOD FOR GENERATING DESIGN CONSTRAINTS FOR MODULES IN A HIERARCHICAL INTEGRATED CIRCUIT DESIGN SYSTEM

(75) Inventors: Timothy M. Burks, Palo Alto, CA (US); Michael A. Riepe, San Jose, CA (US); Hamid Savoj, Los Altos, CA (US); Robert M. Swanson, Palo Alto, CA (US); Karen E. Vahtra, Sunnyvale, CA (US); Lukas van Ginneken, San Jose, CA (US)

(73) Assignee: Magma Design Automation, Inc., Santa Clara, CA (US)

(*) Notice: Subject to any disclaimer, the term of this patent is extended or adjusted under 35 U.S.C. 154(b) by 0 days.

(21) Appl. No.: 10/166,944

(22) Filed: Jun. 10, 2002

(65) Prior Publication Data

US 2003/0009734 A1 Jan. 9, 2003

Related U.S. Application Data

(60) Provisional application No. 60/296,792, filed on Jun. 8, 2001.

(51) Int. Cl.⁷ .............................................. G06F 17/50
(52) U.S. Cl. ...................... 716/6; 716/4; 716/5; 716/10
(58) Field of Search .............................. 716/6, 4, 5, 10

(56) References Cited

U.S. PATENT DOCUMENTS

| | | | | |
|---|---|---|---|---|
| 5,067,091 A | * | 11/1991 | Nakazawa | ...................... 716/3 |
| 5,521,837 A | * | 5/1996 | Frankle et al. | ................. 716/10 |
| 5,778,216 A | | 7/1998 | Venkatesh | |
| 5,903,471 A | | 5/1999 | Pullela et al. | |
| 6,086,621 A | * | 7/2000 | Ginetti et al. | .................. 703/19 |
| 6,145,117 A | * | 11/2000 | Eng | ............................. 716/18 |
| 6,167,557 A | | 12/2000 | Kudva et al. | |
| 6,367,060 B1 | * | 4/2002 | Cheng et al. | .................. 716/10 |
| 6,415,426 B1 | * | 7/2002 | Chang et al. | ................... 716/9 |
| 6,453,446 B1 | * | 9/2002 | van Ginneken | ................ 716/3 |
| 2003/0014720 A1 | * | 1/2003 | Ito et al. | ......................... 716/6 |

FOREIGN PATENT DOCUMENTS

WO    WO 99/34310    7/1999

OTHER PUBLICATIONS

Sutherland et al.,"Logical Effort: Designing Fast CMOS Circuits", 1999, Morgan Kaufmann Publishers, Inc., pp. 210, 13–24, 51 57, 210–213.*

Dai, et al., "Hierarchical Physical Design Methodology for Multi–Millon Gate Chips," Silicon Perspective Corporation, pp. 179–181, (Jan. 04, 2001).

International Search Report PCT/US02/18423, ",", (Oct. 22, 2003).

* cited by examiner

Primary Examiner—Vuthe Siek
Assistant Examiner—Sun James Lin
(74) Attorney, Agent, or Firm—Pillsbury Winthrop LLP

(57) ABSTRACT

What is disclosed is a method for budgeting timing in a hierarchically decomposed integrated circuit design, which includes: 1) optimizing at least one path through block pins, the optimization resulting in assigned gains for all the cells along said at least one path; 2) performing timing analysis on the at least one path, the timing analysis using the assigned gains in order to generate arrival times for signals at said block pins; and 3) deriving a tinting budget by examining said generated arrival times at said block pins.

50 Claims, 7 Drawing Sheets

METHOD FOR GENERATING DESIGN CONSTRAINTS FOR MODULES IN A HIERARCHICAL INTEGRATED CIRCUIT DESIGN SYSTEM

CROSS-REFERENCE TO RELATED APPLICATION(S)

This application claims priority from a provisional patent application entitled "Method for Generating Design Constraints for Modules in a Hierarchical Integrated Circuit Design System", filed on Jun. 8, 2001, and bearing Ser. No. 60/296,792.

BACKGROUND

In Electronic Computer Aided Design (ECAD) software systems, an integrated circuit design specification and implementation data must be stored as a set of database records, and these records have some finite maximum size based on the virtual memory capacity of the computer on which the software is running. In addition, the execution time of the ECAD software normally increases with the size of the design. The data to represent a very large integrated circuit design may be too large to fit in a computer's memory, or the execution time required to design or simulate the entire design may be prohibitive. This is particularly true where the number of components (i.e. gates) and attendant connections within an integrated circuit are in the 10s or 100s of millions or more.

Hierarchical decomposition or "partitioning" is a technique which may be used to reduce the complexity of a large integrated circuit design specification so that the memory and/or execution time required to complete the design remains manageable. Instead of representing the design as a single flat database, the design is partitioned into pieces, often called "blocks", which can be designed and verified independently. With a given single level of hierarchy, the design specification consists of a set of blocks and the top-level interconnections between those blocks. With multiple levels of hierarchy the blocks may themselves consist of smaller sub-blocks and their interconnections.

Hierarchical decomposition may also be used simply as an organizational tool by a design team as a method for partitioning a design project among several designers. However, this logical hierarchy created by the design team in the design specification does not need to be the same as the physical hierarchy used to partition the design for implementation. Often the logical hierarchy is much deeper than the physical hierarchy. A process of block flattening may be used to transform the logical hierarchy into an appropriate physical hierarchy.

A conventional hierarchical design project typically proceeds in two major steps: a top-down block planning step followed by a bottom-up verification step. If the blocks themselves are implemented during the top-down phase (i.e. each block is implemented before its children) the flow is referred to as a top-down flow. Conversely, if the blocks are implemented during the bottom-up phase (i.e. each block is implemented after all of its children have been completed) the flow is referred to as a bottom-up flow. The top-down and bottom-up flows each have their advantages and disadvantages. Without loss of generality, a top-down flow is used as an example in the remainder of this document. A bottom-up flow could be implemented using identical techniques.

FIG. 1 shows a typical top-down block planning and implementation flow. It begins with a partitioning of the design netlist to map the logical hierarchy into the physical hierarchy, defining the top-level block and the set of sub-blocks to be implemented (step 110). Each sub-block is then assigned a width and height value and a placement in the floorplan (step 115). Locations are then assigned to the pins on each sub-block, which represent the locations where nets cross the sub-block boundaries (step 120). This is followed by a time budgeting step indicating which portion of the clock cycle is allocated to the timing paths that cross the sub-block boundaries (step 135).

At this point in a top-down flow, after the top-level block has been planned, the process is prepared to implement the block. All leaf-cells (standard cells and macros) owned by the block are assigned a placement, and all nets owned by the block are routed (step 140). If any of the nets were routed over the sub-blocks (so-called "feedthrough nets") these wires are pushed down into the sub-blocks that they overlap, and new pins are created on the sub-block where the wires cross the sub-block boundaries (step 145). Then, recursively implement the sub-blocks according to the same process (step 150). This involves recursively performing steps 110 to 170 while treating each sub-block as the top-level block.

For the above process to complete successfully the shapes, pin locations, and timing budgets assigned to each block (steps 115 through 135) must represent achievable constraints. Otherwise the system may not be able to complete the implementation of some blocks according to their specifications. In such a case the specifications may need to be refined and the top-down process may need to be repeated before a correct implementation can be realized. Such an iterative refinement is time-consuming and should be avoided. Thus, methods for achieving high-quality results in these steps are of critical importance.

When the recursive top-down planning and implementation step is complete the bottom-up verification process can commence. Proceeding from the lowest-level blocks toward the top-level, each block is independently analyzed for logical correctness, as well as its timing and electrical performance, and compared against its specification (step 155). After all sub-blocks of a block have been independently verified the block itself can be analyzed (step 170), under the assumption that the sub-blocks are correct.

To work on an individual module, a designer or software tool requires a representation of the environment in which that module must operate. This includes the physical shape of the space in which the module is placed, the location of its input and output pins, power and other important signal routing information, the operating conditions (temperature and voltage), the expected details of the process used to fabricate the module, and the timing characteristics of the interface between the module and its environment. The focus of this method is to provide a representation of the timing characteristics. The problem is complicated by the fact that this representation must be generated before other modules or the top-level netlist has been completed. The result is that the timing characteristics used for design must be an approximation of the timing characteristics of the final product.

This set of timing characteristics is called the "timing budget" of a module. Good timing budgets must have the following characteristics-Completeness, Balance, and Achievability.

Completeness describes the characteristics of a budget at the block boundary. A complete timing budget describes the entire relevant context of a module. It should include signal arrival time constraints for all input pins (including bidirectional pins) and signal required time constraints for all output pins (also including bidirectional pins). It should include descriptions of all clocks that are applied as inputs of the design, generated within the design, or used as a reference for the timing constraints applied at the module outputs. It should also include any other special constraints that must be satisfied inside the module, such as global limits on signal transition times (i.e. slew limits). When the timing budget for a module is incomplete, the module cannot be fully designed without its context and the final design is likely to contain errors associated with violated constraints that were omitted from the budget. This is the minimal requirement for a timing budget.

Next, for successful integration of the top-level design, a set of timing budgets must be balanced. Balance describes the relationship between a budget, the top-level timing, and other budgets in the design. Balanced timing budgets guarantee that if all modules' timing constraints are satisfied, the top-level timing constraints will also be satisfied. When timing budgets are unbalanced, designers are forced to rework the final design to resolve problems that appear during integration of the top level. This rework often occurs very late in the design process and may require drastic and painful changes. Failure to generate balanced timing budgets may be seen as a lack of design discipline that has delayed timing closure in design methodologies.

The requirements of completeness and balance make achievability the most challenging aspect of the time budgeting problem. Achievability relates to the relationship between a timing budget and the block to which it applies. The difficulty is to create budgets that are achievable while maintaining balance and completeness. To achieve rapid design closure, it is crucial for the designer or design tool to have the ability to meet the timing constraints that are specified for each module. When the timing budget for a module is unachievable, designers are forced into a difficult cycle of iterative implementation and renegotiation of budgets. Each iteration attempts to resolve the conflicts between the timing requirements of the top-level netlist and other modules in a design and the difficulties found in implementing the module being designed. The inability to measure achievability is the biggest problem faced by design teams today and is the largest contributor to the failure to achieve timing closure that is experienced in contemporary design methodologies.

There is a need to provide a timing budgeting solution that better conforms to the completeness, balance, and achievability necessary but that does so in a resource-utilization friendly manner.

SUMMARY

What is disclosed is a method for budgeting timing used in producing an integrated circuit design. The circuit design has register cells and combinational logic cells, and has a representation that is hierarchically decomposed into a top-level and a plurality of blocks. At least some of the plurality of blocks are capable of being further hierarchically decomposed. The register cells and combinational logic cells have at least one cell pin. The blocks have boundaries, and these block boundaries represented by at least one block pin. The method includes:

1) optimizing at least one path, that path through a block pin, the optimization resulting in assigned gains for all the cells along that path;
2) performing timing analysis on that path, the timing analysis using the assigned gains in order to generate arrival times for signals at the block pin; and
3) deriving a timing budget by examining the generated arrival times at the block pin. The timing analysis is performed, in some embodiments, following a zero-slack trimming algorithm which adjusts gains of cells until the slacks converge about a certain tolerance of zero.

BRIEF DESCRIPTION OF THE DRAWINGS

These and other objects, features and advantages of the present invention are better understood by reading the following detailed description, taken in conjunction with the accompanying drawings, in which.

DETAILED DESCRIPTION

Figure 1:
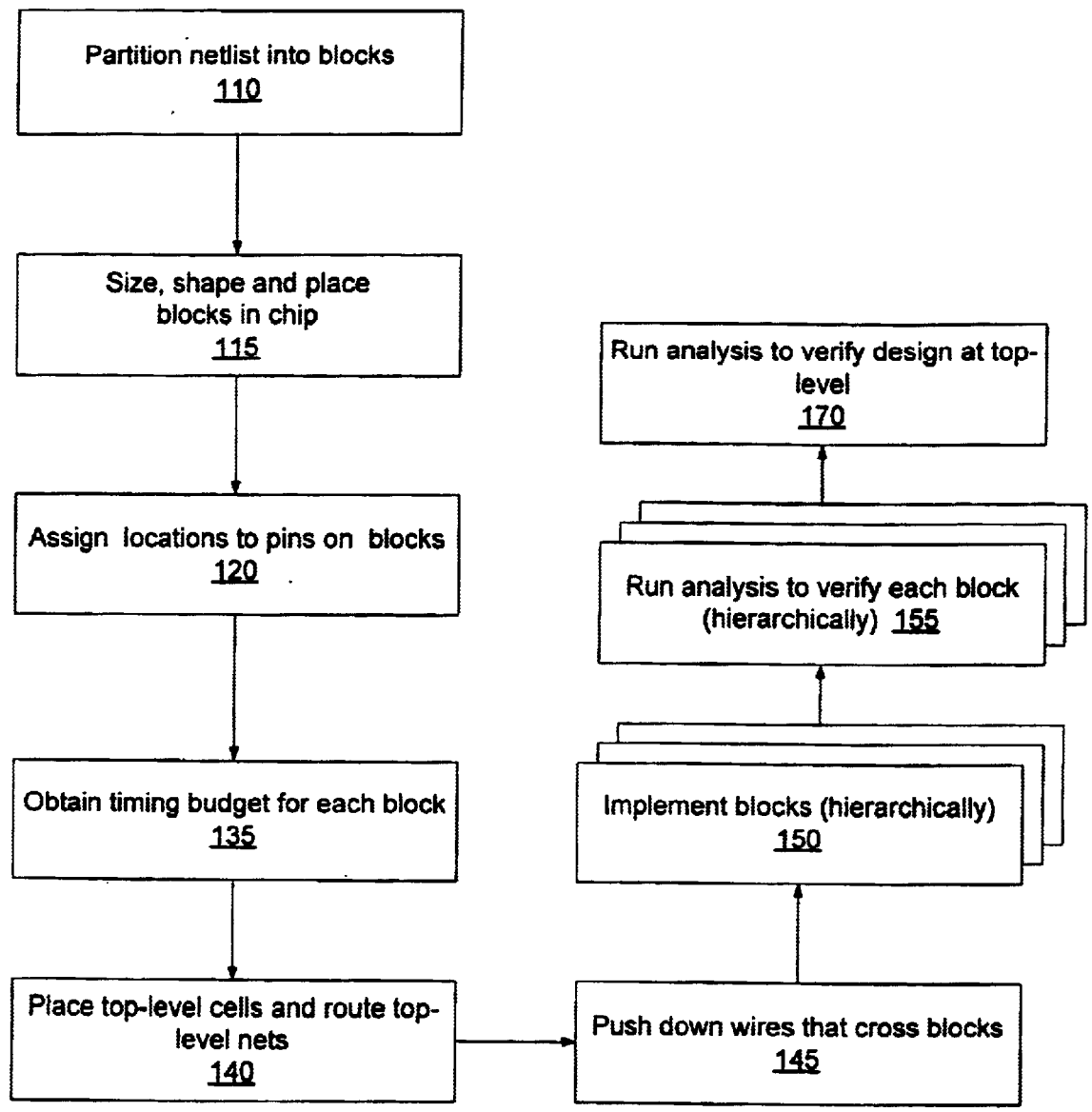
FIG. 1 illustrates an exemplary hierarchical design process.
Figure 2:
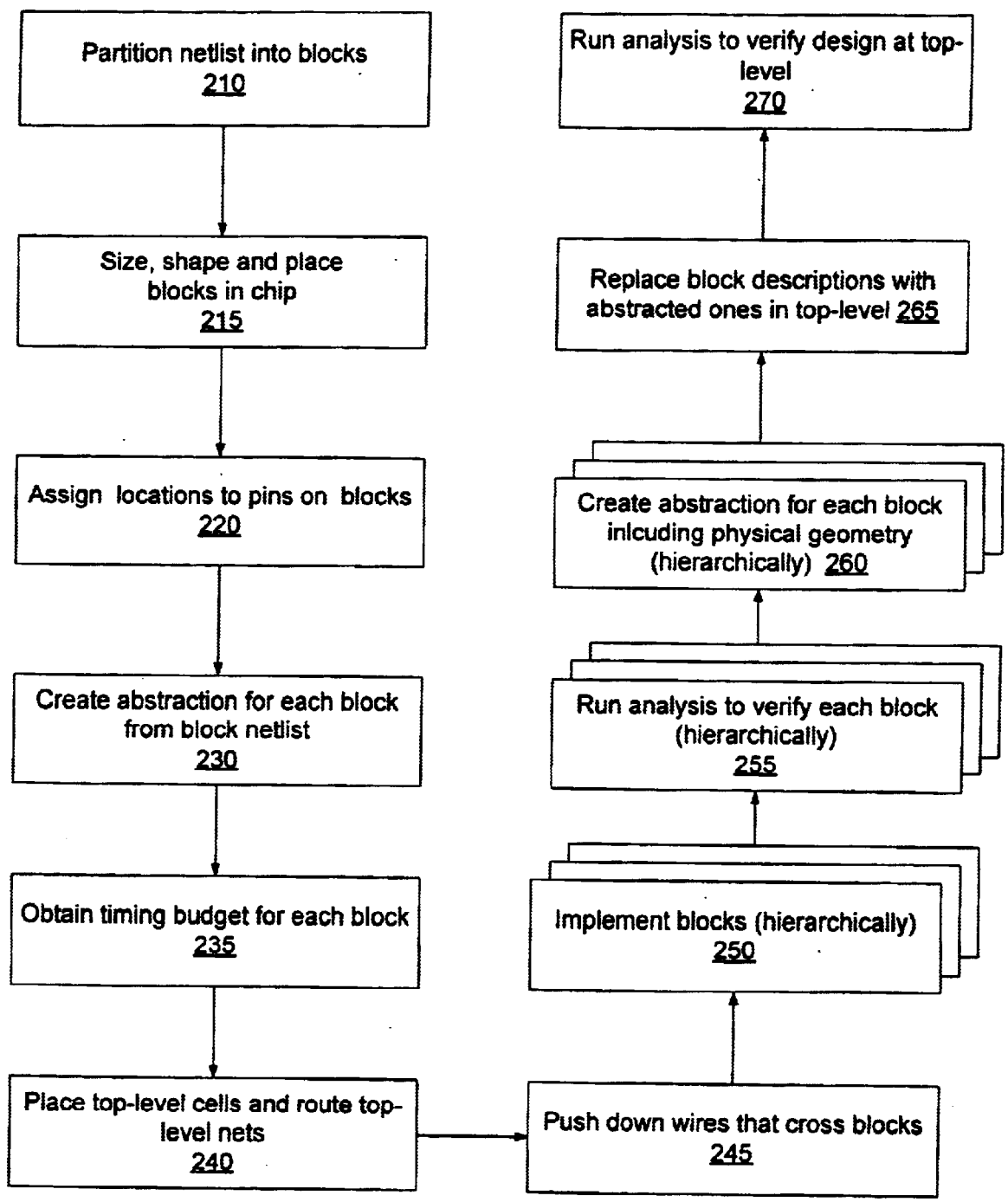
FIG. 2 illustrates the role of time budgeting in a hierarchical design flow using abstractions.

One way of implementing the top-down hierarchical design process is the hierarchical design flow shown and described in FIG. 2. The design flow shown in FIG. 2 is a refinement of the top-down flow shown in FIG. 1, with three additional steps, 230, 260, and 265. The refinement concerns a method for modeling a sub-block, in the context of its parent and sibling blocks, during the top-down budgeting and block implementation steps, as well as the bottom-up verification steps. These steps represent places in the flow at which the clean hierarchical boundaries are violated and there is a need for cross-boundary analysis. Without an effective technique for managing this cross-boundary analysis the primary advantage of the hierarchical design process—its ability to reduce the memory and runtime required to design a large integrated circuit-may be lost.

During the top-down budgeting step one objective is to analyze the combinational logic paths (combinational logic gates between registers (latches and/or flip-flops)) that cross one or more hierarchical boundaries, and determine what fraction of the clock cycle should be budgeted for each segment of the path.

During the top-down block implementation step, a block is placed and routed before its sub-blocks have been implemented. In most cases the placement and routing is fairly decoupled across hierarchical boundaries. However, many modern manufacturing processes require the routing wires to obey a set of rules called "antenna rules" that require detailed knowledge of the routing wires present on both sides of a hierarchical boundary.

During the bottom-up verification process there is also a need to analyze the combinational logic paths that cross the hierarchical boundaries. When analyzing a block that contains sub-blocks, it would be desirable to take advantage of the fact that the sub-blocks have been pre-verified, avoiding the need to re-analyze the sub-blocks while analyzing their parents.

To address this, some embodiments of the invention disclose, the use of a reduced model, referred to as a block "abstraction", that captures the structure and behavior of the block in sufficient detail that the interface with its parent block and its sibling blocks may be correctly analyzed. The goal of the abstraction is to reduce the amount of memory required to represent a block to its ancestors in the hierarchy, and reduce the amount of execution time required to analyze each instance of the block in the context of its parents and sibling blocks.

As mentioned above, in this regard, the hierarchical design flow of FIG. 1 is supplemented and enhanced by additional steps 230, 260, and 265. In step 230, prior to the time budgeting step, abstractions of each sub-block are created for use during budgeting. Because the sub-block has not yet been implemented it contains no physical implementation data, only its netlist description. Therefore the abstraction used during budgeting is intended to model the logical behavior of the sub-block only, details of the physical and electrical behavior are not yet available. This initial abstraction is used during budgeting and then discarded.

One key difference between a top-down block implementation flow and a bottom-up block implementation flow is that, in the former, a block is implemented before its children, while in the latter a block is implemented after its children. The hierarchical implementation flow in FIG. 2 would be modified to place blocks 240 and 245 between blocks 265 and 270. The main impact is that, in a top-down flow, the top-level block is being implemented before the implementation of its children is complete. Therefore the invention makes use of the sub-block budgets as idealized optimization target while implementing their parent. In a bottom-up flow, on the other hand, a block must be implemented before its parent's or sibling block's implementations are known. It must therefore also make use of its timing budget as an idealized optimization target.

This design process is further detailed in a co-pending patent application entitled "Representing the Design of a Sub-module in a Hierarchical Integrated Circuit Design and Analysis System," filed on Jun. 10, 2002 (Attorney's reference number 054355-0293259). One critical step in the overall design process is time budgeting (as outlined in step 235).

Figure 3:
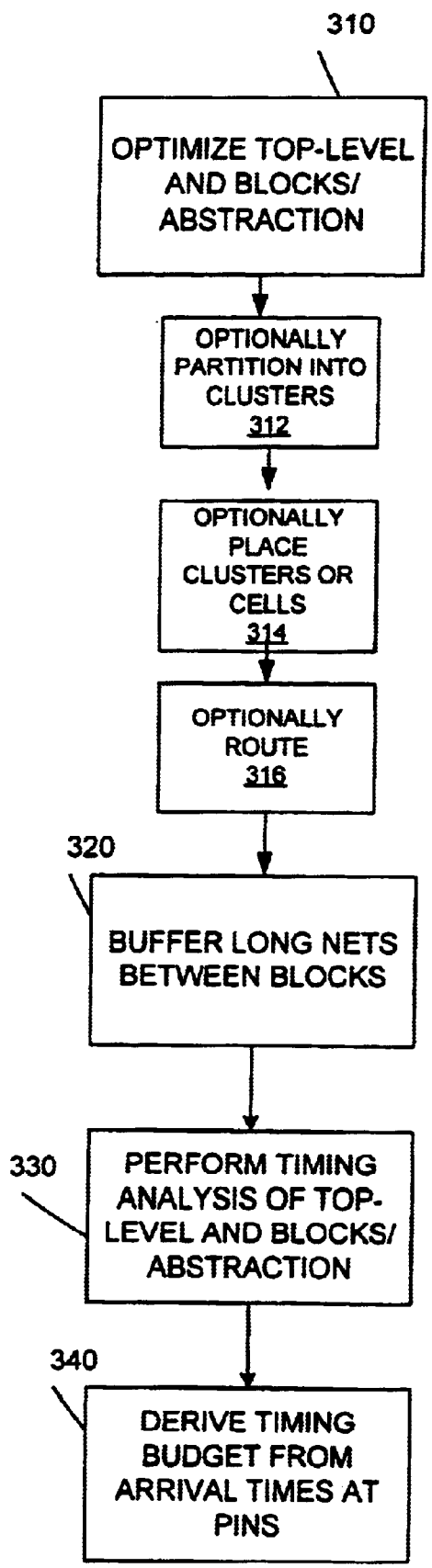
FIG. 3 illustrates a time budgeting approach which can be used in a hierarchical system which generates an abstraction of design modules.

FIG. 3 illustrates a time budgeting approach which can be used in a hierarchical system which generates either blocks or an abstraction of blocks mentioned above. The time budgeting approach discussed herein can be used where blocks, while capable of being hierarchically decomposed, have not been abstracted. By way of definition, "cells" refer herein to either "register" cells such as latches and flip-flops or to "combinational logic" cells such as AND gates, OR gates and other non-memory circuit components. Each of the cells have input "pins" and output "pins". Pins in this context refers to a way of representing interconnects such as actual pins and/or wires. A "top-level" refers to that part of integrated circuit design contained by no blocks other than itself. The top-level and blocks both have cells contained within them. Further, each block, as described above, has a "boundary" which may be logical or physical or both.

Time budgeting, in one embodiment of the invention, First, according to step 310, optimize paths between register cells of the top-level and register cells of the blocks and/or abstractions of the blocks. Next, according to step 312, optionally partition the blocks into clusters. Also, optionally, whether or not step 312 is performed, according to step 314, perform a placement of the clusters (if any) or the cells in the design. Next, in step 316, optionally perform a routing between the placed cells. This routing is often referred to as global routing. Then, according to block 320, optionally buffer long nets between blocks. Next, a timing analysis of the top-level and then the blocks (and/or abstractions) is performed (block 330) resulting in arrival times. One key aspect of the invention is that the timing analysis is based upon gains of cells. Finally, time budgets can be derived (block 340) by allocating delays (using gains) to achieve zero slack and examining the arrival times at pins on the block boundaries.

The time budgeting method above can be implemented by the integration of several components into a common platform. These include:

(1) A timing analysis engine. The timing engine supports incremental timing analysis of hierarchical design descriptions and incorporates a variety of delay models.

(2) An engine and method for the characterization of cell delays as a function of gain. Families of cells with equivalent logic function are grouped together and characterized to express the delays of their cells as a function of their gain, which is a quantity defined to be proportional to the ratio of the capacitance a cell drives to its input capacitance. Gains are normalized so that a delay of 1.0 corresponds to the loading that is considered optimal. Under this characterization, the delays of cells are independent of their load. This indicates that specific cell size or wire capacitance information is not required to perform timing analysis. This allows deferring sizing decisions to later in the design process and also gives an important metric that can be used to measure the achievability of a design.

(3) A gain-based zero slack process referred to as "trimming". The trimming algorithm draws from the Theory of Logical Effort, which states that the optimal performance of a path is obtained when the gains of the cells along that path are equal. To obtain a zero-slack solution, the trimming algorithm smoothly increases and decreases gain in response to local slack information provided by the timing analysis engine.

(4) An optional clustering process. Cells are optionally grouped and placed in clusters to speed global placement.

(5) An optional coarse cell placer. This placer incorporates information from each of the previously described components to allow approximate cell sizes to be used to generate a placement with minimal overlap. As soon as an initial placement is available, the timing analysis engine begins including the effects of this placement by using models of wire capacitance, resistance, and delay that are based on the Manhattan distances between pins.

(6) An optional coarse routing tool. It too integrates guidance from each of the previous components to assign locations to wires in the top-level design. If included, it allows inclusion of wire models based on global routing topologies into the analyses performed by the timing engine.

For inputs, the time budgeting process of FIG. 3 would need the following:

(1) An initial netlist. This netlist should be partitioned hierarchically in correspondence with the desired hierarchical design structure. Each block in the hierarchy must be represented, preferably by a netlist or alternatively in the form of a precharacterized block such as one would find in a description of a standard cell library. Both representations are only estimates of the blocks' final characteristics. Although typical hierarchical designs are implemented with two levels of hierarchy, it is important to note that the method can be applied to designs with an arbitrary number of levels.

(2) A description of a cell library. This should include description of the logic function performed by each cell so that cells can be grouped into classes of cells that have equivalent inputs, outputs, and functions. The cell library description should also contain information that allows calculation of the delay of each cell as a function of the load capacitance it drives and other optional parameters such as the signal transition time at a cell's inputs.

(3) A description of the process technology such as VLSI design technology. Primarily this should contain enough information to allow wire capacitance and resistance to be computed as a function of wire length and routing layer.

(4) The timing constraints for the top-level netlist. These include definitions of any clocks that are used in the design, top-level input and output signal timing constraints, exceptions to any of the normal rules of timing analysis, and limits or other restrictions on quantities computed by timing analysis, such as signal transition times.

Figure 4:
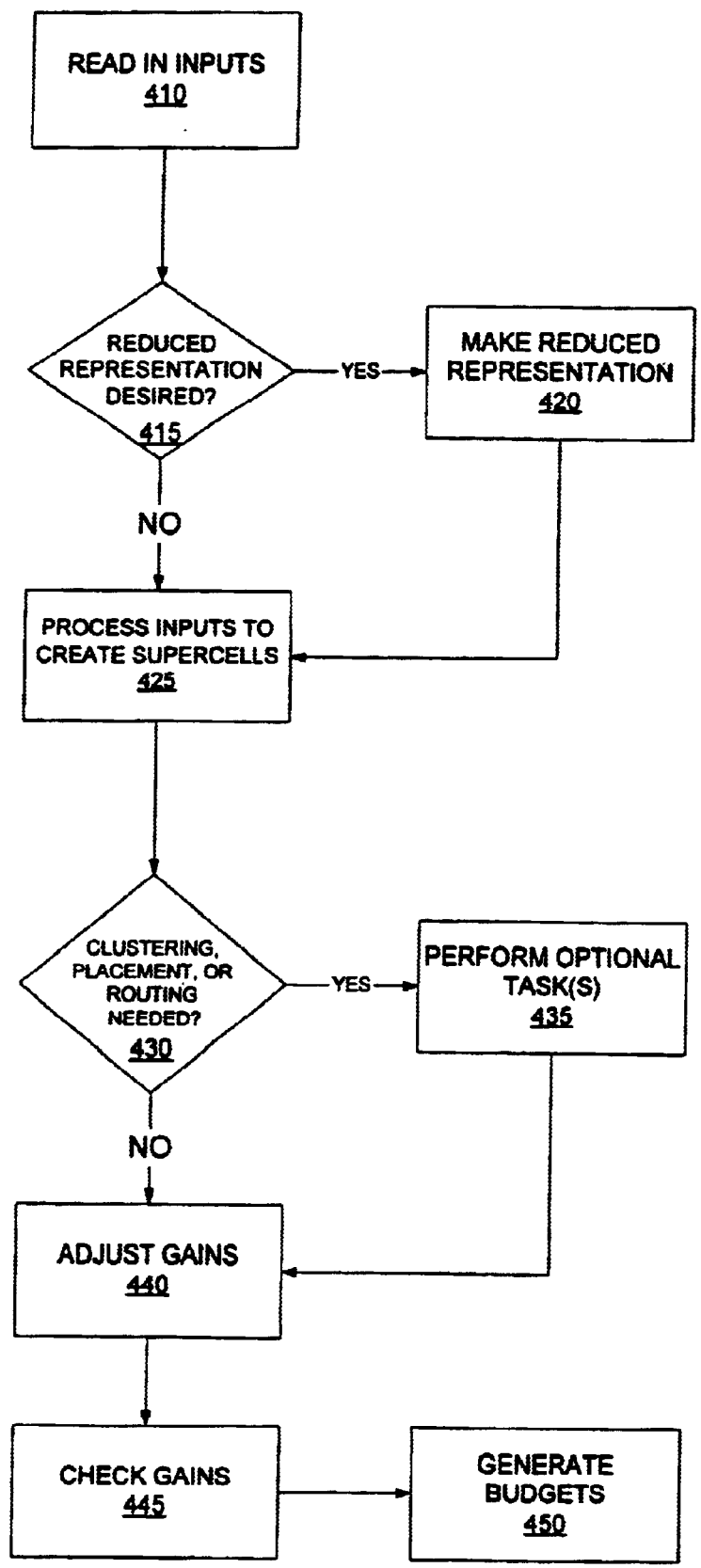
FIG. 4 represents a time budgeting process according to at least one or more embodiments of the invention.

FIG. 4 represents a time budgeting process according to at least one or more embodiments of the invention. First, according to step 410, all inputs are read in. This includes reading in the library description, the hierarchical netlist, and the top-level timing constraints. Libraries may be represented in a text format that presents the available cells in a library, the function of each cell, and information that can be used to compute the delay and output signal transition times of each cell. Netlists may be represented in a hardware description language (e.g. Verilog). Next, if a reduced description of a blocks netlist is desired (checked at step 415), blocks may be reduced (step 420) by removing components of the respective netlists that have no influence on boundary timing. Such a step would reduce the amount of resources needed to process the design.

In accordance with one aspect of the invention, the next step is to process the library to create "supercells" (block 425). A "supercell" refers to a family of gates with common pins and function. This family would ideally include a wide range of device sizes with different input capacitances and output drive strengths. The delay of a supercell is characterized as a function of its gain and if available, the input transition time of the supercell. For ease of analysis, delays are characterized as a function of a scaled gain that allows considering a gain of 1.0 as a "good" gain. This unit gain is loosely related to the gain of an inverter driving a "typical" fan-out of approximately 4. Delay varies roughly linearly with gain and increases as gain is increased and falls as gain is reduced.

If any one or more of clustering, placement or routing are desired/required (checked at step 430), then these optional routines are performed (step 435). Clustering reduces the number of objects being placed, which can improve the performance of the global placement step. Placement gives initial locations for all cells. If a cell was placed as part of a clusters, its location is taken from the cluster location. This global placement should be done "virtually flat", ignoring hierarchy boundaries. Global routing increases the accuracy of the wire models.

Next, gains are adjusted until top-level timing constraints are satisfied (step 440). Gains can be adjusted using an enhanced zero-slack trimming algorithm which is discussed below with respect to FIG. 5. Also, in accordance with some embodiments of the invention, these gains can be checked to measure achievability (step 445). In implementing an embodiment of the invention, as one condition, no gain can be less than 0.2, although in many situations, tighter bounds may be more appropriate. In general, achievability is measured as a function of the gain profile of the cells in a design and observe design experiments that indicate that as the percentage of cells with gains less than 1.0 increases above 2.5%, it becomes increasingly difficult to achieve design convergence and note that when all cells have gains greater than 1.0, design success is virtually guaranteed.

Zero-slack Based Analysis

The most preferred timing analysis results for generating a budget are those in which all slacks in a design are zero. Slack measures how closely a timing constraint is satisfied. Positive slack indicates that a constraint is satisfied with a safety margin equal to the slack value. Circuits with positive slack are usually considered to be overdesigned, since the slack indicates that the circuit could either be operated at a higher speed or redesigned to operate at the same speed using less area or power. Negative slack indicates that a constraint is unsatisfied and cannot be satisfied unless delays in the circuit are modified by the amount of the slack. Ideally, zero slack indicates that constraints are exactly satisfied with no margin for error and no unnecessarily wasted resources. However, it is rare to find a circuit for which all timing constraints have slack of exactly zero. Even when the most critical paths in a design have zero slack, most of the remaining paths have slacks that are positive by a large margin.

The invention in various embodiments utilizes a novel zero-slack algorithm to apportion slack along a path. Zero-slack algorithms typically work by increasing or reducing delay budgets for individual gates and wires until the slack of the circuit based on the budgeted delays is zero. While many different conventional zero-slack algorithms are in vogue, they are often ad hoc heuristic algorithms that rely on trial-and-error by the algorithm designer to obtain the best method to modify gate delays. Details of a novel zero-slack algorithm are presented with reference to FIG. 5 and described below.

Figure 5:
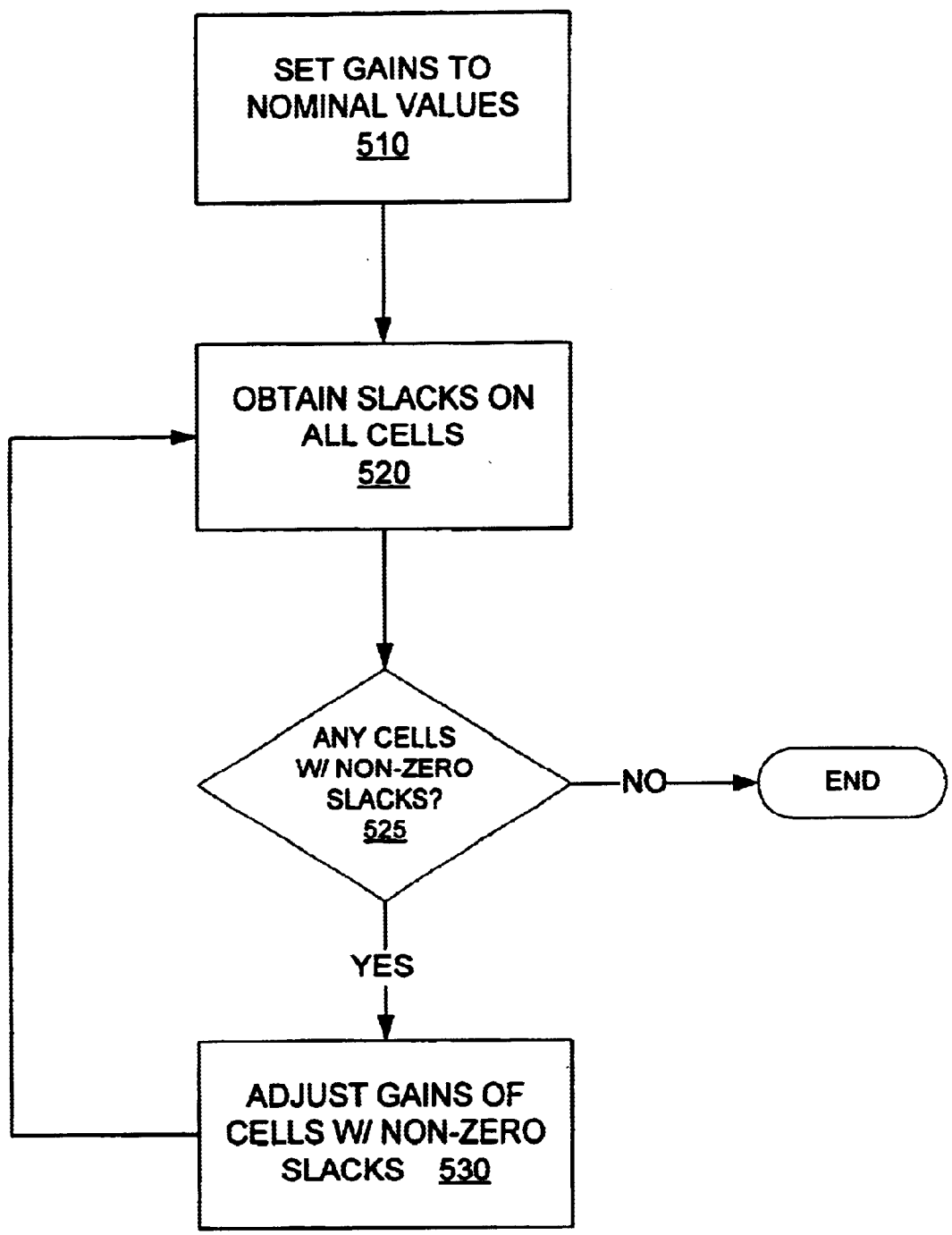
FIG. 5 illustrates a zero-slack "trimming" algorithm according to one or more embodiments of the invention.

FIG. 5 illustrates a zero-slack "trimming" algorithm according to one or more embodiments of the invention. First, all gains are set to nominal value (block 510). Next, use static timing analysis to obtain slacks on each cell (block 520). The methodology checks to see whether any of the obtained slacks are non-zero (block 525) (non-zero in this context means greater than a certain tolerance limit about zero). If so, the gains of cells with the non-zero slacks are adjusted (block 530) (within feasible limits). After adjusting the gains in this manner, flow control returns to block 520 and static timing analysis is once again employed to obtain slacks on each cell. This timing analysis can be incremental, but note that even when the gains of only a few cells change, the slacks of many cells may be affected. The trimming algorithm is discussed in greater detail below.

The trimming algorithm works on networks of supercells. Each supercell represents the delay of a family of gates (such as 2-input AND gates). The delay of a supercell is a function of its gain, which determines the ratio of output capacitance to gate input capacitance. Increasing the gain of a supercell increases its delay, and reducing gain reduces delay.

The trimming algorithm adjusts the drive strengths of gates until all slacks in the circuits are zero or all gates to be changed are at their maximum or minimum allowable gain.

It begins with all supercells initialized to a nominal gain value (block E10). Then, static timing analysis is used to compute the worst timing slack on each gate (block 520). The gains of each gate are then adjusted by an amount that depends on this slack value if this slack value is non-zero (blocks 525 and 530). Gates with negative slack have their gains reduced (to make the gates faster) and gates with positive slack have their gains increased (since these gates can be made slower). The size of each gain adjustment is chosen to make the adjustment process converge smoothly. The amount of each change is related to the magnitude of the slack; larger gain reductions are made for gates with large negative slack than for gates with small negative slack. Similarly, larger gain increases are made for gates with large positive slack than for gates with small positive slack. The amount of each change is also related to the length of the critical path through each gate. Smaller changes are made to gates that lie on long paths (paths with a large number of gates) than gates that lie on shorter paths. After these changes are made, a new static timing analysis is performed, and new set of gain adjustments is made. The process stops when no more changes can be made, either because all slacks are zero (and no changes are necessary) or all the gates to be changed are already set to have their largest or smallest possible gain.

Although the trimming algorithm specifically adjusts delays of cells, it can also include the effects of wire delays. Such an inclusion is possible when performing initial placement and routing in the disclosed budgeting procedure. A placement allows modeling wire delays as a function of the distance between cells. If a routing is also done, the timing analysis can model wire delays even more accurately by following the globally routed path of each wire. It is even possible to interleave global placement and routing between steps of the trimming algorithm so that the placement and sizing converges simultaneously.

Figure 6:
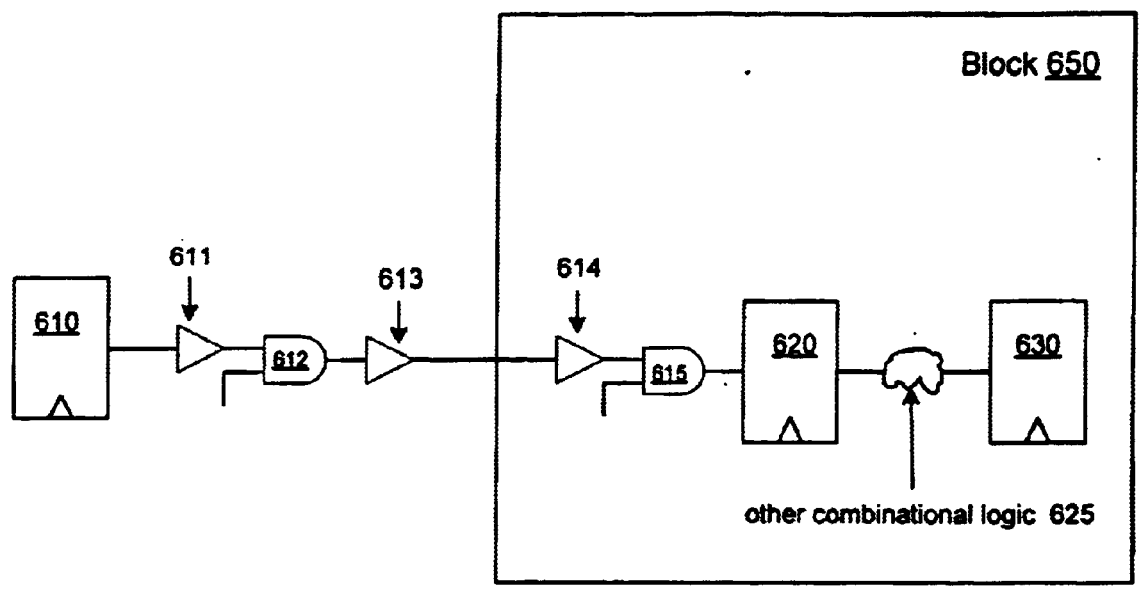
FIG. 6 illustrates an exemplary circuit for which a time budgeting solution can be evaluated using one or more embodiments of the invention.

FIG. 6 illustrates an exemplary circuit for which a time budgeting solution can be evaluated using one or more embodiments of the invention. The circuit shown is logically divided into a block 650 which connects with other components in a top-level portion. The top-level portion includes a register element 610 which outputs to a buffer 611. The buffer 611 and an unspecified other signal serve as inputs to an AND gate 612. The result of the AND gate is buffered through 613 after which it approaches the boundary of block 650. The output of 613 is connected to the input of a buffer 614 inside block 650. Buffer 614 and an unspecified signal serve as inputs to an AND gate 615. The output of AND gate 615 is sent to a register element 620. Register element 620 feeds other combinational logic 625 which then feeds a register 630. Registers 610, 620 and 630 are all clocked by a clocking signal CLK (not shown).

The timing of this circuit is dependent on what happens inside the block as well as what happens outside the block. However, some paths inside and outside block 650 are unrelated to the timing at the boundary of the top-level and block 650. During budgeting, these paths can be completely ignored. For example, the path through combinational logic block 625 is contained entirely within the block. With the exception of the clock input, the timing of this path is unaffected by all signals at the block boundary. And as long as the clock period is held constant, the timing of this path is unaffected by the specific time at which clock signals enter the block.

Those gates/elements which do not contribute to the timing at the boundary can be discarded according to the abstraction process discussed above. This abstraction retains the parasitic information needed while discarding what is irrelevant. For the example in FIG. 6, the logic in block 625 can be removed or ignored during timing analysis and trimming. The trimming algorithm would then adjust the delays of gates 611–615 until the slack on the path from 610 to 620 was zero. The signal arrival time at the boundary of block 650 would become the budgeted arrival time for this input.

The initial placement provides useful estimates of the delays of wires in a design. When there are too many cells in the netlists to place individually, one can use a clustering algorithm to merge them together into groups which are then placed based on the connectivity between groups. The location of individual cells is then derived from the locations of the placed clusters.

With an initial placement, one can use Manhattan-based wire models to compute estimated resistance, capacitance, and delays of individual wires in the design. Although the cell delay models presented herein do not depend on capacitance, the wire delay estimates are extremely useful for improving the zero-slack trimming algorithm that seeks to optimize a design by adjusting the gain of each cell.

The trimming algorithm iteratively interleaves a global timing analysis with a gain-adjustment step that can potentially adjust the gain for every cell in the design. In each gain-adjustment step, the gain at each gate is smoothly increased or decreased by an amount proportional to the local slack at the gate and inversely proportional to the maximum topological path length through the gate. This ensures that the gains along critical paths move smoothly and simultaneously toward their final trimmed value and that the trimmed gains for each cell along a critical path are equal.

Trimming is not the only tool available for timing optimization. As a workaround for situations in which trimming produces dangerously low gains, optional steps can be performed to fix structural problems in the netlist. Such steps include:

remapping architecture selection (metacell swapping)

speedup restructurings

Each of these operations is a discrete change to the circuit that necessitates further trimming to smoothly absorb non-zero slack into individual gate delay budgets.

Shell abstractions can be used to cut out parts of the modules that are not visible at the interface. These parts should be excluded from the top-level timing analysis and any trimming or structural optimization that is done at the top level. Similarly, the top-level netlist can be pruned to remove parts of the netlist that are not visible to specific blocks for which budgets are needed.

Creating Timing Constraints for Modules

Budgets may be generated by converting properties of the top-level model into constraints for lower level modules (step 450). When a zero-slack timing solution has been obtained, the arrival and required times at each node in the circuit are equal. At module boundaries, these times may be interpreted as budgeted values. For module inputs, they represent arrival times, the latest or earliest times that signal transitions are presented to the block boundary from the environment. For module outputs, these times represent required times, the latest or earliest times that signal transitions at module outputs can occur without causing a timing failure in another part of the circuit.

Input arrival and output required times may be relative to one or more reference clocks, and it is also possible for clocks to enter a module to control internal storage elements.

As a result, it is also desirable to include definitions of these clocks in the timing budget. These clock definitions are represented by special constraints that describe clocks in the timing model for the budgeted module. The difference between the ideal time of each clock and the actual time at which the clock arrives at the input is represented with another special constraint that specifies the external latency of a clock.

A few other miscellaneous timing constraints in the top-level timing model are copied down into the timing budget for a module. User-specified constants indicate that certain nets are always at constant logic values. This indicates that the timing of signal transitions on these nets can be ignored and also allows other constants to be derived by combining user-specified constants with the logical function of the gates in the design. All user-specified or derived constants that affect a module are included in its budget. Also, any constraints that represent limits and margins are also copied down into the timing budget for the module.

There is one remaining type of constraint which must be represented in timing budgets; these constraints are called path exceptions. Path exceptions describe exceptions to the normal rules of timing analysis and are applied to user-specified paths in a circuit. They identify false paths, multicycle paths, and paths that are constrained to have either a minimum or maximum specified delay. All path exceptions that affect a module should be included in its budget. However, many path exceptions may refer to pins outside the module itself. This requires us to rewrite these exceptions into a form suitable for timing analysis of the module.

To explain this rewriting, consider one way in which path exceptions may be supported in a static timing analyzer. To properly apply a path exception, it is necessary to partition the signal arrival times at a pin into two groups, a group which is affected by the exception and a group which is not. To enable this partitioning, associate a special symbol, called a "mark", with each pin which is named in a path exception. Each pin may have a unique mark, or to reduce resource usage, marks may be assigned to groups of pins. These marks are then associated with the signal arrival time at each marked pin and are propagated to all arrival times that are dependent on the arrival times at marked pins. Any pin in a design may have a number of different arrival times associated with it, each arrival time being identified with a different combination of marks. This can occur because a number of different paths may exist to any pin in a design, and some of those paths may be affected by path exceptions while others are not. Because each marked arrival time may be affected by a different path exception, each marked arrival time associated with a pin may have a different required time and corresponding slack value.

For example, a-multicycle path constraint specified from a pin named "A" and through a pin named "B" would create a mark for all arrival times that result from paths through pin A and a second mark for all arrival times that result from paths through pin B. At any endpoint, only arrival times with both marks A and B would be affected by the exception.

When an exception refers to pins outside a module, it is modified by replacing each reference to an external pin with the name of the associated mark. The mark is essentially an alias for the external pin; it is included explicitly because one cannot directly refer to the external pin.

To support path exceptions that cross module inputs, make the arrival time constraints for module inputs specifically associate marks with the arrival times that they present to the module inputs. Each module input may thus have a number of arrival times, which allows us to associate different arrival times with different paths through the block inputs.

To support path exceptions that cross module outputs, make the required time constraints at module outputs specifically associate marks with the required times being enforced at the module outputs. Each marked required time will only apply to an arrival time with the exact same marking. This allows associating different required times with different paths through block outputs. If a path exception is wholly contained inside a module, there is no need for it to be modified, since all of the associated pins are available inside the module.

Figure 7:
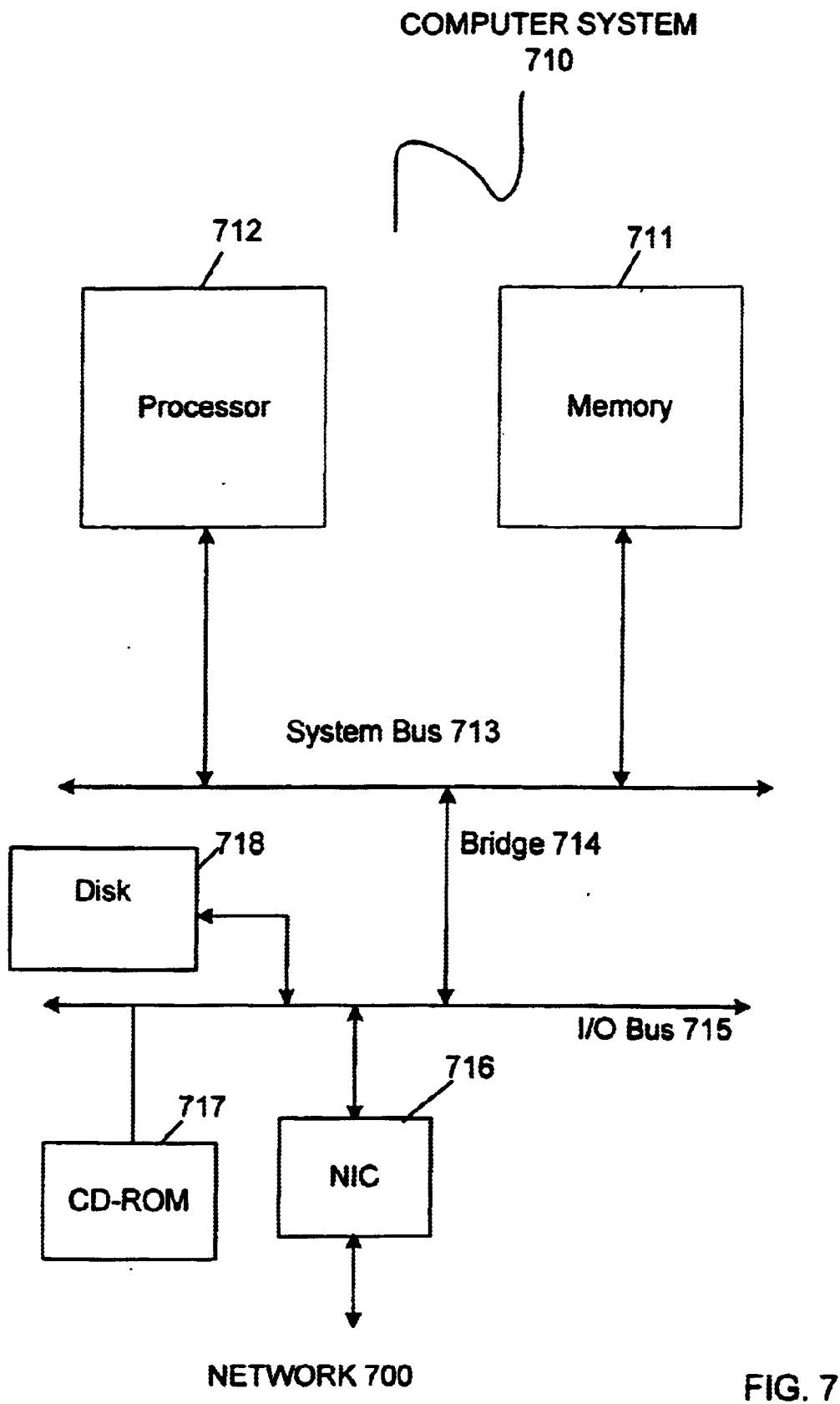
FIG. 7 illustrates a computer system capable of implementing one or more embodiments of the invention.

FIG. 7 illustrates a computer system capable of implementing one or more embodiments of the invention. Illustrated is a computer system 710, which may be any general or special purpose computing or data processing machine such as a PC (personal computer) which can optionally be coupled to a network 700. The memory 711 of computer system 710 may be insufficient to budget the entire circuit design and thus, the budgeting process may need to be broken up. In this way, pieces of the budgeting can be handled by several different computer systems each of which may be similar to computer system 710.

One of ordinary skill in the art may program computer system 710 to perform the task of budgeting through zero-slack trimming algorithms and static timing analysis as set forth in various embodiments of the invention. Such program code may be executed using a processor 712 such as CPU (Central Processing Unit) and a memory 711, such as RAM (Random Access Memory), which is used to store/load instructions, addresses and result data as needed. The application(s) used to perform the functions of time budgeting and timing analysis may derive from an executable compiled from source code written in a language such as C++. The executable may be loaded into memory 711 and its instructions executed by processor 712. The instructions of that executable file, which correspond with instructions necessary to perform time budgeting and timing analysis, may be stored to a disk 718, such as a floppy drive, hard drive or optical drive 717, or memory 711. The various inputs such as the netlist(s), constraints, delays, capacitances, wire models, cell library and other such information may be written to/accessed from disk 718, optical drive 717 or even via network 700 in the form of databases and/or flat files.

Computer system 710 has a system bus 713 which facilitates information transfer to/from the processor 712 and memory 711 and a bridge 714 which couples to an I/O bus 715. I/O bus 715 connects various I/O devices such as a network interface card (NIC) 716, disk 718 and optical drive 717 to the system memory 711 and processor 712. Many such combinations of I/O devices, buses and bridges can be utilized with the invention and the combination shown is merely illustrative of one such possible combination.

The present invention has been described above in connection with a preferred embodiment thereof; however, this has been done for purposes of illustration only, and the invention is not so limited. Indeed, variations of the invention will be readily apparent to those skilled in the art and also fall within the scope of the invention.

What is claimed is:

1. A method for budgeting timing used in producing an integrated circuit design, said circuit design having register cells and combinational logic cells, said circuit design having a representation that is hierarchically decomposed into a top-level and a plurality of blocks, at least some of the plurality of said blocks being capable of being further hierarchically decomposed, said register cells and combinational logic cells having at least one cell pin, said blocks having boundaries, said block boundaries represented by at least one block pin, said method comprising:

optimizing at least one path, through block pins by zero-slack trimming that includes adjustment of gains within at least some of said cells along said at least one path to apportion slack between said cells along said at least one path, said optimization resulting in assigned gains for all said cells along said at least one path;

performing timing analysis on said at least one path, said timing analysis using said assigned gains in order to generate arrival times for signals at said block pins; and deriving a timing budget by examining said generated arrival times at said block pins wherein said timing budget at said block pins is derived using said generated arrival times at block inputs and required times at block outputs.

2. A method according to claim 1 further comprising:
buffering long nets between blocks.

3. A method according to claim 1 further comprising:
partitioning of said blocks into clusters.

4. A method according to claim 3 further comprising:
placing of said clusters.

5. A method according to claim 4 further comprising:
placing of cells contained in said top-level and in said blocks.

6. A method according to claim 5 further comprising:
routing among said cells, if said cells are placed.

7. A method according to claim 1 wherein said input arrival times and output required times are considered by including definitions of reference clocks in said timing budget.

8. A method according to claim 1 wherein said timing budget includes at least one of user-specified constants, derived constants, and constraints representing limits and margins.

9. A method according to claim 1 further comprising:
reading in a set of inputs related to the design.

10. A method according to claim 9 wherein optimizing includes:
optionally making an abstraction of said blocks; and
processing said set of inputs to create supercells.

11. A method according to claim 9 wherein said set of inputs includes at least one of an initial netlist, a description of a cell library, a description of process technology to be employed, and timing constraints for the top-level netlist.

12. The method according to claim 1 wherein said blocks can be represented by one or more abstractions.

13. The method according to claim 1 wherein said optimizing is performed in a concurrent fashion among all paths that cross block boundaries.

14. A method for budgeting timing used in producing an integrated circuit design, said circuit design having register cells and combinational logic cells, said circuit design having a representation that is hierarchically decomposed into a top-level and a plurality of blocks, at least some of the plurality of said blocks being capable of being further hierarchically decomposed, said register cells and combinational logic cells having at least one cell pin, said blocks having boundaries, said block boundaries represented by at least one block pin, said method comprising:

optimizing at least one path through a block pin by zero-slack trimming to apportion slack along said at least one path, said optimization results in assigned gains for all said cells along said at least one path wherein said zero-slack trimming comprises:

setting said assigned gains to nominal values; and
obtaining slack values on all said cells based on those said assigned gains, performing timing analysis on said at least one path, said timing analysis using said assigned gains in order to generate arrival times for signals at said block pins; and deriving a timing budget by examining said generated arrival times at said block pins.

15. A method according to claim 14 further comprising:
adjusting said assigned gains on cells having slack values that diverge beyond a certain tolerance about a zero value; and repeating obtaining and adjusting until all said cells have slack values within said certain tolerance about zero or until the assigned gains on cells have reached their limits.

16. A method according to claim 15 wherein adjusting includes:
reducing assigned gains on cells whose obtained slack value is negative; and
increasing assigned gains on cells whose obtained slack value is positive.

17. A method according to claim 16 wherein the amount by which said assigned gains are adjusted is proportional to the magnitude of the obtained slack value.

18. A method according to claim 17 wherein the amount by which said assigned gains are adjusted is further related to the length of a critical path through the cells.

19. A method according to claim 14 wherein said trimming includes consideration of the effects of wire delays.

20. A method according to claim 14 wherein said zero-slack trimming is preceded by at least one of step of structural optimization including remapping, architecture selection and speedup restructuring.

21. A method for budgeting timing used in producing an integrated circuit design, said circuit design having register cells and combinational logic cells, said circuit design having a representation that is hierarchically decomposed into a top-level and a plurality of blocks, at least some of the plurality of said blocks being capable of being further hierarchically decomposed, said register cells and combinational logic cells having at least one cell pin, said blocks having boundaries, said block boundaries represented by at least one block pin, said method comprising:

optimizing at least one path through a block pin, said optimization resulting in assigned gains for all said cells along said at least one path;

performing timing analysis on said at least one path, said timing analysis using said assigned gains in order to generate arrival times for signals at said block pins; and deriving a timing budget by examining said generated arrival times at said block pins, wherein said timing budget also includes path exceptions.

22. A method according to claim 21 wherein path exceptions includes false paths, multi-cycle paths and paths constrained to have specified delay limits.

23. A method according to claim 22 wherein path exceptions that refer to pins outside said blocks are modified to refer to marks that uniquely correspond to external pins or groups of pins.

24. A method according to claim 23 wherein separate arrival times are specified at each block boundary for each possible combination of marks that can correspond to pins in the fan-in set of the block input.

25. A method according to claim 23 wherein separate required times are specified at each block output for each possible combinations of marks that can correspond to pins in the fan-out set of the block output.

26. An article comprising a computer readable medium having instructions stored thereon to implement a method for budgeting timing used in producing an integrated circuit design, said circuit design having register cells and combinational logic cells, said circuit design having a representation that is hierarchically decomposed into a top-level and a plurality of blocks, at least some of the plurality of said blocks being capable of being further hierarchically decomposed, said register cells and combinational logic cells having at least one cell pin, said blocks having boundaries, said block boundaries represented by at least one block pin, said instructions when executed causing:

optimizing at least one path, through block pins by zero-slack trimming that includes adjustments of gains within at least some of said cells along said at least one path to apportion slack between said cells along said at least one path, said optimization resulting in assigned gains for all said cells along said at least one path;

performing timing analysis on said at least one path, said timing analysis using said assigned gains in order to generate arrival times for signals at said block pins;

deriving a timing budget by examining said generated arrival times at said block pins wherein said timing budget at said block pins is derived using said generated arrival times at block inputs and required times at block outputs.

27. The article according to claim 26 further causing: buffering long nets between blocks.

28. The article according to claim 26 further causing: partitioning of said blocks into clusters.

29. The article according to claim 28 further causing: placing of said clusters if any.

30. The article according to claim 29 further causing: placing of cells contained in said top-level and said blocks.

31. The article according to claim 30 further causing: routing among said cells.

32. The article according claim 26 wherein said zero-slack trimming comprises:

setting said assigned gains to nominal values; and obtaining slack values on all said cells based on those assigned gains.

33. The article according to claim 32 further causing:

adjusting said assigned gains on cells having slack values that diverge beyond a certain tolerance about a zero value; and repeating obtaining and adjusting until all said cells have slack values within said certain tolerance about zero or until the assigned gains on cells have reached their limits.

34. The article according to claim 33 wherein adjusting includes:

reducing assigned gains on cells whose obtained slack value is negative; and increasing assigned gains on cells whose obtained slack value is positive.

35. The article according to claim 34 wherein the amount by which gains are adjusted is proportional to the magnitude of the obtained slack value.

36. The article according to claim 35 wherein the amount by which assigned gains are adjusted is further related to the length of a critical path through the cells.

37. The article according to claim 26 wherein said trimming includes the effects of wire delays.

38. The article according to claim 26 wherein said zero-slack trimming is preceded by at least one of step of structural optimization including remapping, architecture selection and speedup restructuring.

39. The article according to claim 26 wherein said input arrival times and output required times are considered by including definitions of reference clocks in said timing budget.

40. The article according to claim 26 wherein said timing budget includes at least one of user-specified constants, derived constants, and constraints representing limits and margins.

41. The article according to claim 26 wherein said timing budget also includes path exceptions.

42. The article according to claim 41 wherein path exceptions includes false paths, multi-cycle paths and paths constrained to have specified delay limits.

43. The article according to claim 42 wherein path exceptions that refer to pins outside the module are modified to refer to marks that uniquely correspond to external pins or groups of pins.

44. The article according to claim 43 wherein separate arrival times are specified at each module input for each possible combination of marks that can correspond to pins in the fan-in set of the module input.

45. The article according to claim 43 wherein separate required times are specified at each module output for each possible combinations of marks that can correspond to pins in the fan-in set of the module output.

46. The article according to claim 26 further comprising: reading in a set of inputs related to the design.

47. The article according to claim 26 wherein optimizing includes:

optionally making an abstraction of said blocks; and processing said set of inputs to create supercells.

48. The article according to claim 47 wherein said set of inputs includes at least one of an initial netlist, a description of a cell library, a description of process technology to be employed, and timing constraints for the top-level netlist.

49. The article according to claim 26 wherein said blocks can be represented by one or more abstractions.

50. The article according to claim 26 wherein said optimizing is performed in a concurrent fashion among all paths that cross block boundaries.

* * * * *